UNITED STATES PATENT OFFICE.

JOHN THORP AND WM. G. ANGELL, OF PROVIDENCE, RHODE ISLAND.

IMPROVEMENT IN HEDDLE-STUFFS FOR MAKING WEAVERS' EYE-HARNESSES.

Specification forming part of Letters Patent No. 1,498, dated February 26, 1840.

*To all whom it may concern:*

Be it known that we, JOHN THORP and WILLIAM G. ANGELL, of Providence, Rhode Island, have invented an Improvement in Knotted Heddle-Stuff of which Weavers' Eye-Harnesses are intended to be made, of which the following is a specification.

This heddle-stuff is made of either small annealed wire or of common harness-twine, and is made as follows, to wit: Two pieces of the wire or twine are used, which may be wound each on a spool or bobbin, or may be wound on netting or mesh needles, such as are used in making nets and the common twine-harness; or the person making said stuff may take the two ends or pieces of wire or twine, spool, bobbin, or needle, one in one hand and the other in the other hand, and proceed to form the common square knot with the two pieces, which will unite them in the same way and manner that a lady ties her apron-strings or a child his shoe-strings, when a hard knot is formed in them; but it is very essential in making the heddle-stuff that the knots should be tied at a proper distance from each other to form the desired length to the eye, and that the eyes should be at such a distance from each other as will give the desired width to the harness when made.

The following are the dimensions of the heddle-stuff when calculated to make harness suitable for the weaving of the common power-loom cotton cloth. The person making said stuff will first tie the usual or common knot, which will unite the two pieces of wire or twine, and then tie another similar knot three-fourths of an inch from the first knot, uniting the two pieces of wire or twine again. These two knots will form an eye. The two pieces of wire or twine are next fastened together by knots similar to the first two knots, forming another eye about eleven inches from the first eye, and so on, forming a chain of knotted wire or twine heddle-stuff. These dimensions may be varied any way, either augmenting or diminishing them so as to make a harness to suit the kind of weaving for which it is desired. The size of the wire or twine may be varied to suit the purchaser or the kind of weaving which the harness is intended to perform. The wire or twine heddle-stuff can be made alike with knots entire, though we prefer half-knots to form the eyes in the wire heddle-stuff—that is, two half-knots three-quarters of an inch from each other is sufficient to form an eye in the wire heddle-stuff. What we mean by "two half-knots" is one entire or whole knot unclosed, and the space between its two parts will form the eye. Any other knot that will connect the two pieces of wire or twine will answer the purpose; but we prefer the common square knot.

To convert this chain of heddle-stuff into a harness suitable for use, it must be wound around the shafts on which it is to be used, or onto some convenient apparatus that will give the proper form to the harness, from which apparatus it may be taken and placed onto shafts for use, and in order to hold and confine the heddle-stuff and heddles in their proper places after being wound onto the shafts or onto said apparatus, two pieces of tape or other suitable article are used at each shaft, one piece of which is first stretched along the whole length on one edge of each shaft, around and over which the heddle-stuff will be wound, and the other two pieces will be covered with cement and placed on, upon and over the first two pieces and pressed hard against them, causing them to become cemented to each other, confining the heddle-stuff between them Thus the harness is completed and ready for use.

What we claim as our invention, and desire to secure by Letters Patent, is—

1. The chain of knotted heddle-stuff of which weavers' eye-harnesses are intended to be made, as herein described.

2. The connecting by knots or by half-knots the two pieces of wire so as to form eyes suitable to be used in making weavers' eye-harnesses, as described above.

JOHN THORP.
WILLIAM G. ANGELL.

Witnesses:
HENRY MARTIN,
JOHN GORHAM.